United States Patent
Ballin et al.

(10) Patent No.: US 7,184,049 B2
(45) Date of Patent: Feb. 27, 2007

(54) IMAGE PROCESSING METHOD AND SYSTEM

(75) Inventors: Daniel Ballin, Ipswich (GB); Charles Nightingale, Felixstowe (GB)

(73) Assignee: British Telecommunications public limited company, London (GB)

( * ) Notice: Subject to any disclaimer, the term of this patent is extended or adjusted under 35 U.S.C. 154(b) by 180 days.

(21) Appl. No.: 10/513,032

(22) PCT Filed: May 8, 2003

(86) PCT No.: PCT/GB03/01961

§ 371 (c)(1),
(2), (4) Date: Nov. 1, 2004

(87) PCT Pub. No.: WO03/100728

PCT Pub. Date: Dec. 4, 2003

(65) Prior Publication Data

US 2005/0162432 A1    Jul. 28, 2005

(30) Foreign Application Priority Data

May 24, 2002   (EP) .................................. 02253679

(51) Int. Cl.
*G06T 15/70* (2006.01)
(52) U.S. Cl. ...................... 345/473; 345/581
(58) Field of Classification Search ...................... None
See application file for complete search history.

(56) References Cited

U.S. PATENT DOCUMENTS

| | | | |
|---|---|---|---|
| 5,880,788 A * | 3/1999 | Bregler | 348/515 |
| 5,933,151 A | 8/1999 | Jayant et al. | |
| 6,044,168 A | 3/2000 | Tuceryan et al. | |
| 6,072,496 A * | 6/2000 | Guenter et al. | 345/419 |
| 6,654,018 B1 * | 11/2003 | Cosatto et al. | 345/473 |
| 6,661,418 B1 * | 12/2003 | McMillan et al. | 345/473 |
| 6,828,972 B2 * | 12/2004 | Zhang et al. | 345/473 |
| 6,985,148 B2 * | 1/2006 | Liang et al. | 345/473 |

FOREIGN PATENT DOCUMENTS

EP    0992033 A    4/2000

OTHER PUBLICATIONS

Morishima, "A Media Conversion from Speech to Facial Image for Intelligent Man-Machine Interface", IEEE Journal on Selected Areas in Communications, IEEE Inc., New York, US, vol. 9, No. 4, May 1991, pp. 594-600, XP000874621.

(Continued)

*Primary Examiner*—Mark Zimmerman
*Assistant Examiner*—Enrique L. Santiago
(74) *Attorney, Agent, or Firm*—Nixon & Vanderhye P.C.

(57) ABSTRACT

The invention provides an image processing method and system wherein an image is conceptually textured onto the surface of a three dimensional shape via a projection thereonto. The shape and/or the image position are then moved relative to each other, preferably by a rotation about one or more axes of the shape, and a second projection taken of the textured surface back to the image position to obtain a second, processed image. The view displayed within the processed image will be seen to have undergone an aspect ratio change as a result of the processing. The invention is of particular use in simulating the small movements of humans when speaking, and in particular of processing viseme images to simulate such small movements when displayed as a sequence.

29 Claims, 13 Drawing Sheets

OTHER PUBLICATIONS

Lin et al., "A Speech Driven Talking Head System base don a Single Face Image", Computer Graphics and Applications, 1999, Proceedings, Seventh Pacific Conference on Seoul, South Korea Oct. 5-7, 1999, Los Alamitos, CA, USA, IEEE Computer Soc., US, Oct. 5, 1999, pp. 43-49, 317, XP010359461.

Xu et al., "Three-Dimensional Face Modeling For Virtual Space Teleconferencing Systems", Transactions of the Institute of Electronics, Information and Communication Engineers of Japan, Inst. of Electronics & Communic. Engineers of Japan, Tokyo, JP, vol. E73, No. 10, Oct. 1, 1990, pp. 1753-1761, XP000176466.

Lei et al, "A Three-Dimensional Muscle-Based Facial Expression Synthesizer for Model-Based Image Coding", Signal Processing. Image Communication, Elsevier Science Publishers, Amsterdam, NL, vol. 8, No. 4, May 1, 1996, pp. 353-363, XP004069966.

International Search Report.

* cited by examiner

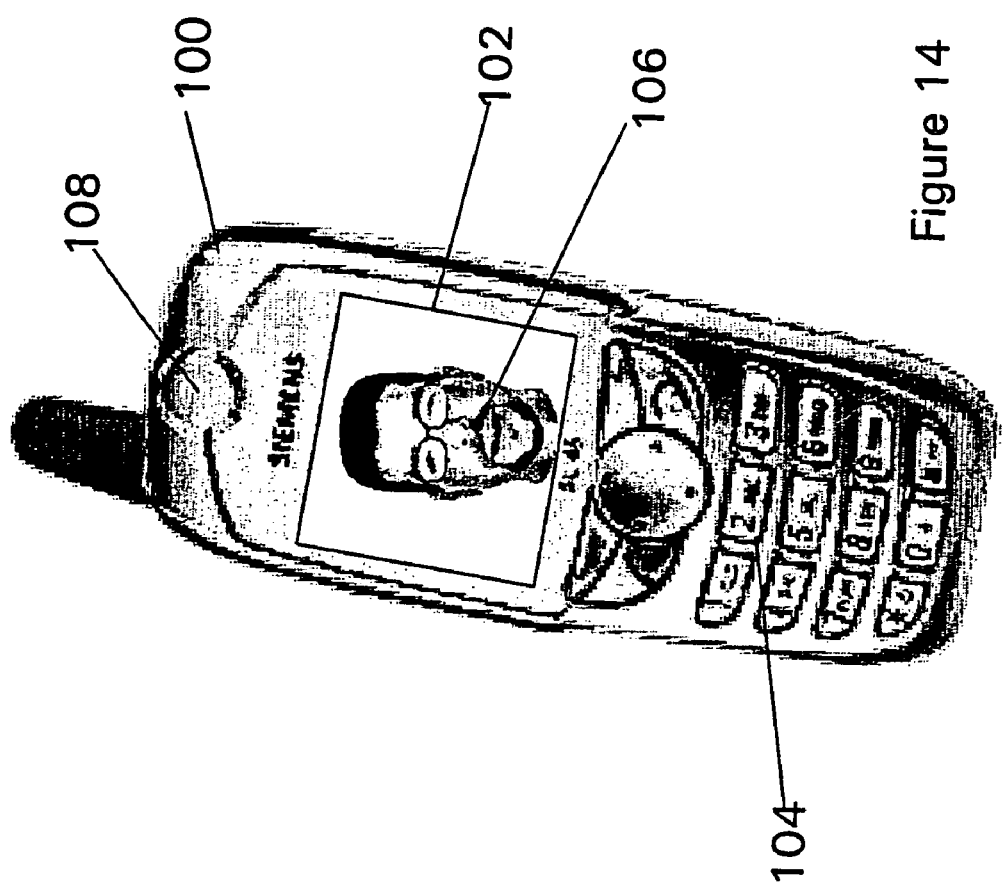

US 7,184,049 B2

IMAGE PROCESSING METHOD AND SYSTEM

This application is the US national phase of international application PCT/GB03/01961 filed 8 May 2003 which designated the U.S. and claims benefit of EP 02253679.1, dated 24 May 2002, the entire content of which is hereby incorporated by reference.

TECHNICAL FIELD

The present invention relates to an image processing method and system, to a computer program arranged to cause a computer to perform the method, and to a computer readable storage medium storing said computer program.

BACKGROUND TO THE INVENTION AND PRIOR ART

It is known that the delivery of synthesised or recorded speech messages can be enhanced by the use of an animated picture of the sender, or by displaying at least the head part of an avatar created of the sender, but in both cases in which only the lips move in synchrony with the reproduced speech. Where a picture of the sender is used, the impression of movement of the lips is created by displaying what is known as a "viseme", which is an image of a human face (for example of the message sender) provided with the lips thereof in one of a number of identifiable shapes, which each represent a lip shape associated with one or more phonemes. Phonemes are, of course, well known in the art and are the individual discrete sounds which are used within a language. It is estimated that there are approximately 44 phonemes in the English language, but perhaps only as few as twenty or so visemes. Therefore, it is possible to display the same viseme when reproducing one of several phonemes.

In operation, a speech reproducer such as a speech synthesiser outputs acoustic waveforms corresponding to a sequence of phonemes, and at the same time a display means displays to the user the appropriate viseme associated with the particular phoneme which has been reproduced at any particular time. Therefore, the user obtains the illusion of an image of the sender whose lips appear to move in synchrony with the reproduced speech. It should be noted that here the visemes are two dimensional images of the sender.

The alternative method known in the prior art, as mentioned above, is to produce either a whole body avatar, or at least a three dimensional virtual model of the sender's head, which is then shaped and textured to look like the sender. The lips of the head model can then be controlled to move in synchrony with the reproduced speech, such that the lips of the model assume the appropriate shape for the particular phoneme being reproduced at any particular time. However such systems involve complex head modelling using a virtual wire frame reshaped by difficult image processing or invasive sensing, and requires a process in which a still picture is accurately conformed to the given model. It is therefore still difficult to reproduce head models without undergoing invasive sensing or scanning of the person whose model is to be created, such as, for example, in a specialist avatar creation booth such as those provided by Avatar-Me Ltd, a United Kingdom limited company no. 03560745. Furthermore, once a 3D model has been obtained, the computation required to achieve the illusion of the model speaking to a user is high, and not presently suitable for implementation on mobile devices, such as mobile telephones, personal digital assistants, or the like.

The first of the aforementioned methods, being that of displaying a sequence of two-dimensional visemes in synchrony with the reproduced speech, does not suffer from the same computational intensity problems as the second of the aforementioned methods, but does suffer from the problem that the displayed image appears to be almost robotic to the viewer, in that they can appear stale, automated, and not life-like. This is because the only movement apparent to the viewer is the movement of the lips to create the appropriate viseme shape corresponding to the present phoneme being reproduced. However, such movement does not correspond to the natural movement of a human being while talking, as it has been observed that most human beings also make very small head movements at the same time as speaking (see 'Autonomous secondary gaze behaviour, M Gillies, N Dodgeson & D Ballin, Proceedings of the AISB2002 symposium on Animating Expressive Characters for Social Interactions, ISBN 1902956256'), but such head movements are difficult to recreate artificially Whilst it would be possible to modify the second of the aforementioned methods (i.e. that of the 3D avatar model) to cause the model to move slightly in accordance with the observed human behaviour, such movement of course brings with it the same problems of high computational intensity as already discussed. In order to get around this problem it would therefore be advantageous if the first of the aforementioned methods (i.e. the two-dimensional viseme method) could be modified to reproduce the observed behaviour.

SUMMARY OF THE INVENTION

The present invention addresses the above problem by providing an image processing method and system which is able to process the two-dimensional viseme images in order to produce processed images which when displayed in sequence reproduced the observed small movements of a human head during speech. The image processing is achieved conceptually by texturing the head image to be processed onto the surface of a 3D shape, which is preferably a 3D virtual shape provided within a virtual space, and then moving the shape slightly to imitate the observed human head movements. Once the shape has been moved slightly a projection of the image from the surface of the shape back to the original image position is taken, which results in a second, processed, image, which is an image of a human head with a slight aspect ratio change. when a sequence of viseme images are processed by the method in turn, and the resultant processed images subsequently displayed to a user in turn, the result is that the observed random movements of a human head during speech are simulated.

It should be noted, however, that whilst the present invention has been developed and is mainly described herein in the context of the problem described in the introductory portion of simulating small human head movements, the image processing method and system which achieves this result is not limited to this sole application, and may find application in broader fields such as, for example, the television special effects industry, computer modelling and mapping applications, or any other field where a two-dimensional image may need to be processed.

Therefore, in view of the above according to a first aspect of the present invention there is provided an image processing method comprising the steps of:

a) texturing at least one surface of a three-dimensional shape with a projection of a first image from an image position and orientation thereof onto said at least one surface;

b) moving one or both of the shape and/or the image position relative to each other; and c) projecting the textured surface of the shape to the image position to obtain a second image at the position and in the same orientation as said first image.

The present invention provides the advantage that an effective image processing operation which reproduces a three dimensional aspect change of the subject displayed in the image can be simulated. There is a further advantage that as both the input and the output are two dimensional images, then computational intensity of an algorithm embodying the method is reduced.

Preferably, the first image forms part of a sequence of first images, the method further comprising repeating steps (a), (b), (c) for each first image in said sequence to obtain a corresponding sequence of second images. Thus, the invention can be applied to a sequence of images in turn in order to allow the same processing to be applied to an "animation" sequence.

In order to specifically address the problems of the prior art, the respective sequences of first and second images preferably each form an animated sequence of a human head speaking.

Preferably, the moving step further comprises randomly moving the shape and/or the image position. This provides the advantage that when the images are of human heads, the observed human movements which the preferred embodiment of the present invention is attempting to recreate are more accurately reproduced.

Preferably, the movement comprises rotating the three dimensional shape of about one or more axes thereof. This provides the advantage that, when the images are images of human heads, the movement by the shape simulates the movement possible of a human head attached to a pair of shoulders.

From a second aspect, the present invention further provides an image processing system comprising:

image receiving means for receiving a first image to be processed;

image processing means; and image output means for outputting a second, processed image;

characterised in that the image processing means further comprises:

shape modelling means arranged to model a three-dimensional shape;

and is further arranged to:

a) texture at least one surface of a three-dimensional shape with a projection of a first image from an image position and orientation thereof onto said at least one surface;

b) move one or both of the shape and/or the image position relative to each other; and c) project the textured surface of the shape to the image position to obtain a second image at said position and in the same orientation as said first image.

The second aspect possesses the same further features and advantages as previously described in respect of the first aspect.

From a third aspect there is also provided a computer program, arranged such that when executed on a computer it causes the computer to perform the method of the first aspect of the invention.

From a fourth aspect, there is further provided a computer readable storage medium storing a computer program according to the third aspect. Preferably, the computer readable storage medium may be any magnetic, optical, magneto-optical, solid-state, or other storage medium known in the art, for example a hard disk, a portable disk, a CD Rom, a DVD, RAM, ROM, programmable ROM, tape, or the like. It should be noted that the list of computer readable storage media given above is not exhaustive, and any known computer readable storage media may suffice.

Further features and advantages of the present invention can be found in the appended claims.

BRIEF DESCRIPTION OF THE DRAWINGS

Further features and advantages of the present invention will become apparent from the following descriptions of embodiments thereof, presented by way of example only, and wherein like reference numerals refer to like parts, and wherein:

FIG. 14 is a perspective view of a mobile telephone provided in accordance with one of the embodiments of the present invention.

DESCRIPTION OF THE PREFERRED EMBODIMENTS

The basic operating concept, which represents a first embodiment of the present invention, will now be described with reference to FIG. 7. A more detailed and practical embodiment will be described later.

Figure 7:
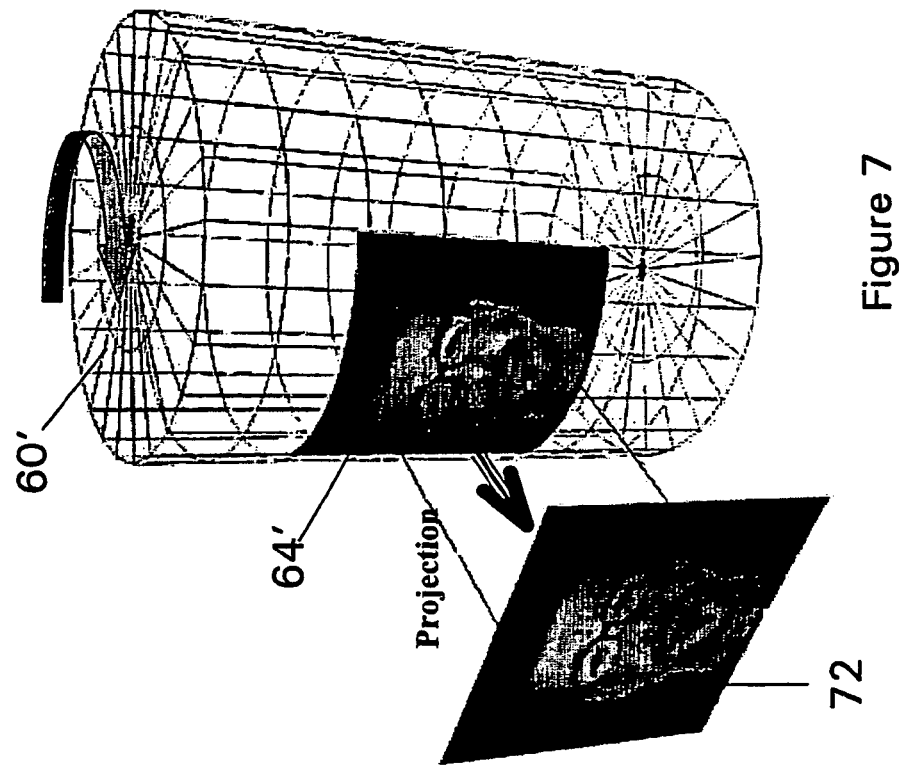
FIG. 7 is a perspective view also showing the basic operating concept behind the present invention.
Figure 6:
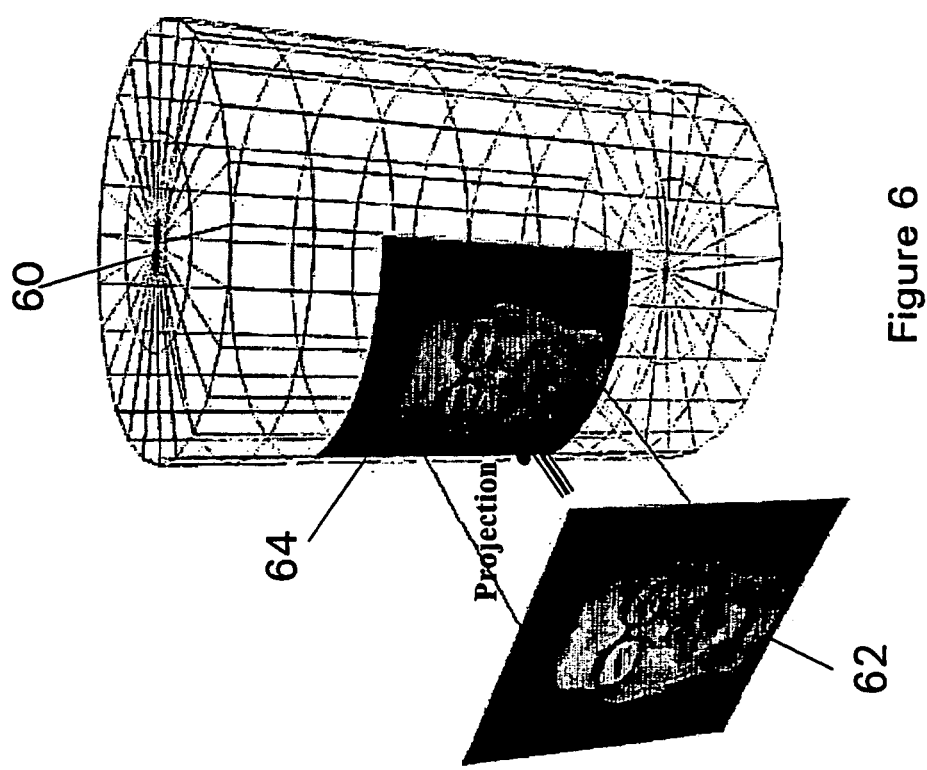
FIG. 6 is perspective view illustrating the operating concept behind the embodiments of the present invention.

With reference to FIGS. 6 and 7, the first embodiment of the present invention provides an image processing method and system which provides for the processing of a first image 62 in order to provide a second, processed, image 72. Conceptually the image processing performed by the present invention is illustrated in FIGS. 6 and 7 and can be described as follows.

In FIG. 6 the first image to be processed, image 62, is provided at a certain position and orientation with respect to a three dimensional shape, being in this case the cylinder 60. The cylinder 60 is a three dimensional virtual shape provided within a virtual space, and the image is provided at the certain position and orientation located within the virtual space. In the embodiment the image is provided located with respect to the cylinder 60 such that the plane of the image is parallel to the axis of the cylinder. It will be further be seen that the orientation of the image is such that the "up and down" axis of the image as shown is also parallel to the axis of the cylinder 60. The cylinder 60 is provided with a curved outer service 64.

In operation, as a first step in the processing the image 62 is "textured" onto the surface 64 of the cylinder by projecting the image 62 onto the surface 64 from the image position. In performing the projection it will be seen that the image orientation is maintained but that the image aspect ratio when applied to the outer surface 64 is changed slightly due to the curving nature of the surface of the cylinder. By "texturing" we mean that the individual pixel luminance and chrominance values are applied to the surface 64 of the cylinder 60 in accordance with the projection of the image thereonto, so that it appears as if the surface 64 is "painted" with the projection of the image 62. It is important to note that the texturing of the surface 64 with the projection of the image 62 effectively binds the respective pixel luminance and chrominance values to the surface 64, such that the image appears to be affixed thereto. Thus, after the projection and texturing the surface 64 is fixedly textured with the projection of the image 62, such that even if the cylinder 60 is moved in any way, the image texturing on the surface 64 moves therewith.

Having textured the surface 64 with the projection of the image 62 such that the projection is bound thereto, the next step in the image processing method is that the cylinder 60 is moved slightly, in this case by a rotation about its axis to a second position 60', as shown in FIG. 7. Because the projection of the image 62 onto the surface 64 is textured thereon such that it is bound thereto, the textured image on the surface 64 also rotates with the cylinder to a second position 64' as shown in FIG. 7. The movement of the cylinder 60 to the second position 60' may be any movement necessary to obtain the desired effect. In the present embodiment where the desired effect is to try and process the image to impart a degree of random movement to the head image contained therein, then the movement is preferably a rotation about the axis of the cylinder of less than ten degrees in either direction, and preferably of no more than one degree. The rotation may be in either direction clockwise or anti-clockwise about the axis.

Within the embodiments of the invention the movement of the shape, i.e. in this case the cylinder 60, are preferably randomly chosen for each image to be processed. That is, a random movement is applied to the shape for each image to be processed. As mentioned above, where the shape is a cylinder and the images are images of heads, preferably the movement of the shape is a rotation about the axis thereof of no more than ten degrees in either direction, but preferably of no more than one degree, the amount of rotation and the direction being randomly chosen within these limits.

Once the shape has been moved, the final step in the image processing method of the embodiments of the invention is to take a projection of the pixel luminance and chrominance values bound to the textured surface 64' from the surface back to the position in relative space of the first image 62. Where the shape has been moved it is necessary to take the projection from the surface back to the original position of the first image in order that the effect of the movement in producing an aspect ratio change of the image is achieved. If the textured surface were merely projected in a direction substantially orthogonal thereto, then the resultant image would be identical to the first image 62. However, by performing the projection from the position of the textured surface 64' back to the original image position and with the same orientation, a second, processed, image 72 formed from the pixel luminance and chrominance values as projected to the first image position is obtained in the same position and orientation as the first image 62, but with the content thereof processed slightly to represent an aspect change due to the movement of the cylinder 60.

In order to process a sequence of images, the same procedure as described above is followed separately for each image. The movement that is applied to the shape, being in this case the cylinder 60, is preferably randomly chosen, and where the shape is a cylinder is preferably a rotation about the main axis of about no more than one degree. Such movements of the shape when textured with each image simulates the natural movements of a human head when speaking.

Alternatively, rather than the movement of the shape being random, the movement may be linked to a measure of the energy in the speech which is to be reproduced at the same time as the resultant processed image 72. For example, where the energy in the speech is great (i.e. the speech is loud) the movement of the shape may be greater than where the energy in the speech is relatively low. This will give the effect of the head presented in the image moving a greater amount when the reproduced speech is of a louder volume.

Other arrangements for controlling the movement may also be provided. Although energy is one way, another approach is to control the shape movement via waveform analysis, such that the movement is determined in accordance with the frequencies included within the speech. As an example, the speech waveform is subject to Fourier analysis to determine the frequencies thereof, and the movement of the shape is controlled in dependence on the found frequencies. Thus, the shape movement can be controlled so as to move the shape more if there is more energy in the lower frequencies of the speech than the higher frequencies, or vice versa.

In another alternative embodiment, the control of the movement is determined not simply upon the sound being reproduced simultaneously, but instead the shape may be moved both before and after sound reproduction is taking place. In this example if someone is shouting and talking very loud and quickly (i.e. they are angry) then the shape can be moved to the largest degree (say from −8 degrees to +8 degrees) from side to side quickly, and then once the loud and quick speech has finished the side to side movement of the shape is gradually reduced and slowed down back into its neutral state. Thus the movement of the shape would continue to occur in a diminishing manner even after the speech has stopped.

Figure 5:
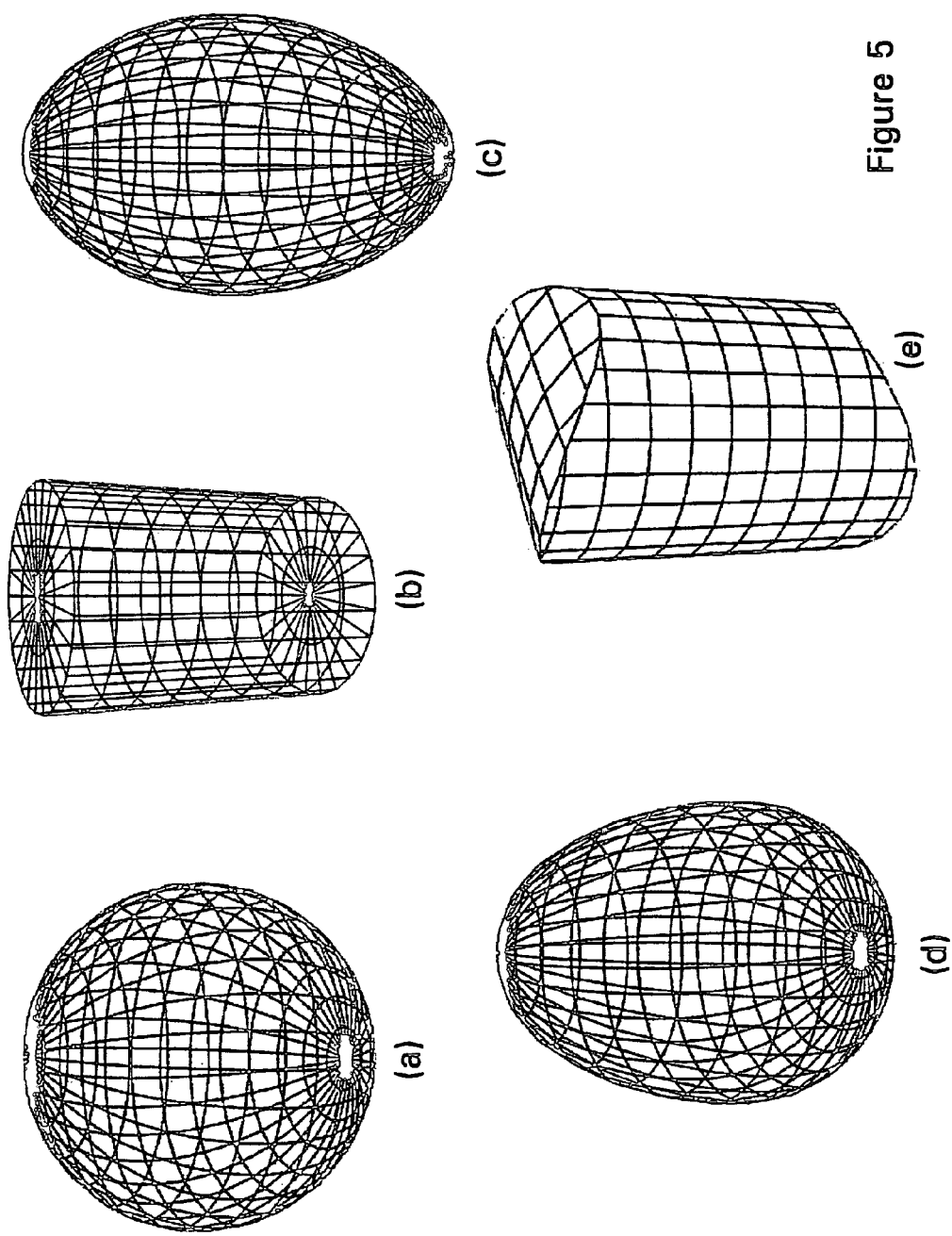
FIG. 5 is a diagram illustrating in wire frame model form the various geometric shapes which may be used in the embodiments of the present invention.

With respect to the shape, whereas in the embodiment previously described we have the used the cylinder 60, it is not essential that a cylinder be used, and FIG. 5 illustrates various shapes which may be used with the present invention. More particularly, FIG. 5a depicts a sphere, which may be used as the shape. In such a case the sphere may be rotated in any direction, and not just about its polar axis. It is also possible for plural rotations about any access thereof to be applied sequentially to achieve more complex movements.

FIG. 5b illustrates a cylinder and preferably the movement applied thereto is a rotation about the long axis, as previously described. Other rotations may be possible, however.

FIG. 5c illustrates an ellipsoid. The movements which may be applied to the an ellipsoid of FIG. 5c are similar to those which may be applied to the sphere shown in FIG. 5a, that is, a rotation about the polar axis, but also about any other axis thereof. Similarly FIG. 5d shows an ovoid shape. The shape of FIG. 5d most closely represents that of a human head and hence may produce advantageous effects in its use. The movements which may be applied to the shape of FIG. 5d are the same as those which may be applied to the sphere or the ellipsoid, that is a rotation about any axis thereof, but preferably about the polar axis.

FIG. 5e shows a shape which we have termed a "double cylinder" that is, a cylinder the upper and lower surfaces of which are shaped as sections of a second cylinder orthogonal to the direction of the first cylinder. Any movement may be applied to this shape, and in particular any rotation about any axis thereof.

Also, note that it is not essential that the textured shape be moved at all; what is essential is that there is a relative movement of the shape with respect to the image position to which the projection of the textured surface is to be made i.e. the image position at which the second, processed image is obtained. Thus, in another embodiment the shape may be kept in the same position and the image position to which the projection of the textured surface is made moved around the shape. In a further embodiment both the image position and the shape may be moved, the respective movements being different to give a relative movement therebetween. In any of the cases described above it is the relative movement of the shape and the image position which results in the aspect ratio change effect, and hence the relative movement which is important.

Where the image position is moved, the movements which may be applied to the image are the corollary of those described above for the shape, e.g. a rotation about one or more axes of the shape (note not of the image).

Having described a first embodiment of the present invention which illustrates the basic operating concept thereof, a more detailed, preferred, embodiment will now be described which embodies the invention within a mobile telephone to allow the life like reproduction of an image of the sender speaking a text message which is to be delivered.

FIG. 14 illustrates a mobile telephone according to the second embodiment of the present invention. More particularly, a mobile telephone 100 is provided, which is itself provided with a display screen 102 and a keypad 104 to allow data entry by the user. An audio reproducing means 108, being an audio transducer, is further provided. When a text message is received at the mobile telephone 100 an image 106 of the sender of the text message is displayed on the screen 102, the image being a sequence of visemes which are chosen to match the phonemes being reproduced by the audio reproducing means 108 to articulate the received text message. In accordance with the second embodiment of the invention the image 106 has been processed so as to confer on the image )he life like movements observed of a human when speaking. The processing of the image 106 to achieve this effect is described next.

Figure 1:
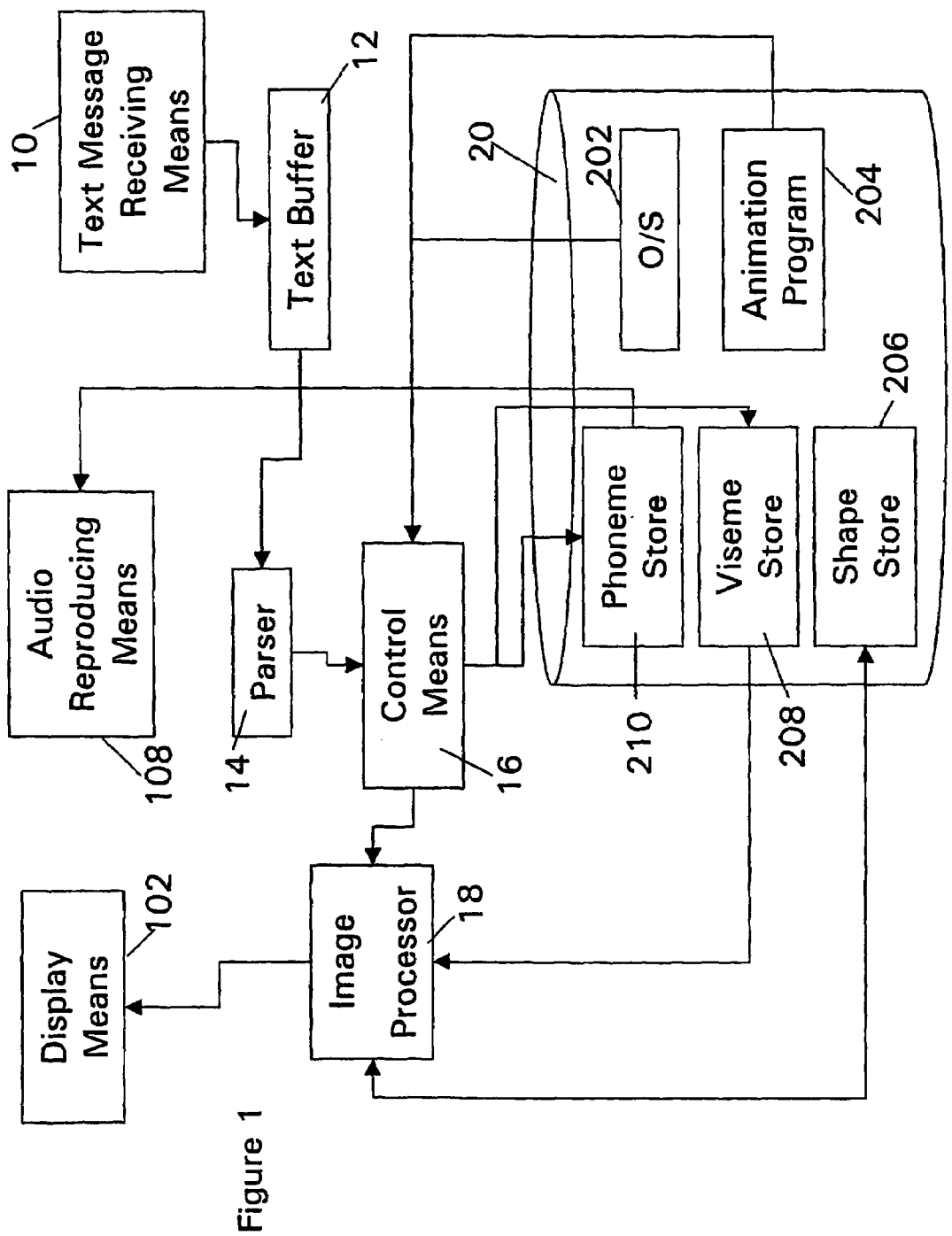
FIG. 1 is a block system diagram of an apparatus according to the present invention.

FIG. 1 illustrates a system block diagram of the necessary elements required to perform the image processing located within the mobile telephone 100. More particularly, within the mobile telephone 100 is provided a text message receiving means 10 which is arranged to receive a text message, for example in accordance with the short message system (SMS) protocol, and to deliver the text of the received text message to a text buffer 12, wherein it is stored. The text of the message stored in the buffer 12 is read by a parser 14 which acts to parse the text to determine the particular phonemes and the order of reproduction thereof which will be required in order to convert the text into a spoken output. The parser 14 therefore takes the text from the text buffer 12 as input, acoustically parses the text, and outputs a sequence of phonemes corresponding to the text to the control means 16. The precise steps to be performed by the parser in parsing the text to produce the phoneme sequence are known in the art, and in particular with respect to prior art text-to-speech systems such as the BT Laureate system. The representation of the phonemes passed to the control means 16 may be any standard phoneme representation, such as SAMPA or the like.

Also provided within the mobile telephone 100 is a storage medium 20, which provides a storage area for a phoneme store 210 wherein acoustic representations of phonemes are stored, such as in the form of waveforms stored as .WAV files. The storage medium 20 further provides a viseme store 208, which stores a sequence of visemes, suitable for display on the display 102. As mentioned previously, a viseme is a image of a human face with a particular lip shape associated with one or more phonemes.

Also provided within the storage medium 20 is a shape store 206, which stores shape data corresponding to any of the geometrical shapes such as spheres, cylinders, ellipsoids, ovoids, or double cylinders, as shown in FIG. 5. The data representing any particular shape preferably takes the form of the coordinates in three dimensional virtual space of the vertices of a large number of polygons which together make up the shape. The shape surface is further defined by the shape data further comprising vertex connection information which specifies how to connect up the vertices to form polygons. A set of vertex point coordinate information, and vertex connection information is stored for each possible shape, within the shape store 206.

Also stored within the storage medium 20 is an operating system program 202 which provides the necessary functionality and protocols for the control means 16 to be able to control and communicate with the various other system elements, as well as an animation program 204 which specifically controls the operation of the control means to control the various other elements to perform the present invention. Preferably, the storage medium 20 provided within the mobile phone 100 is a solid state storage medium, a FLASH multimedia card, or the like.

Also provided within the mobile telephone 100 is an image processor 18, which is controlled by the control means 16 in accordance with instructions contained within the animation program 204, and which is further arranged to access both the viseme store 208 to obtain viseme images therefrom, and the shape store 206 in order to obtain data representing 3D geometric shapes therefrom. The image processor 18 is capable of reading the 3D shape data, in order to model the shape therein. The image processor 18 is arranged to output processed images to the display means 102 for display thereon.

Also provided within the mobile telephone 100 is the audio reproducing means 108, which are arranged to receive phonemes waveforms from the phoneme store 210 and to reproduce the phoneme waveforms in the received order to reproduce the speech represented thereby.

The phoneme store 210, the viseme store 208, and the image processor 18, are all under the control of the control means 16 which maintains synchronisation therebetween. More particularly, the control means 16 controls the phoneme store 210 to output phonemes to the audio reproducing means 108 in sequence to reproduce the received text message as speech. Similarly, the control means 16 controls the viseme store 208 to cause the viseme store 208 to output the correct viseme image to the image processor 18 corresponding to a particular phoneme to be reproduced which is to be output from the phoneme store 210. The image processor 18 processes the image received from the viseme store and outputs the processed image to the display means 102. By maintaining control of the phoneme store, viseme store, and the image processor 18 centrally with the control means, it is possible to maintain synchronisation between the processed visemes being output from the image processor 18 and displayed at the display means 102, and the phoneme waveforms output from the phoneme store 210 for reproduction by the audio reproducing means 108, such that the appropriate processed viseme is displayed on the display means 102 at the same time as the corresponding phoneme waveform is being reproduced by the audio reproducing means 108.

Figure 2:
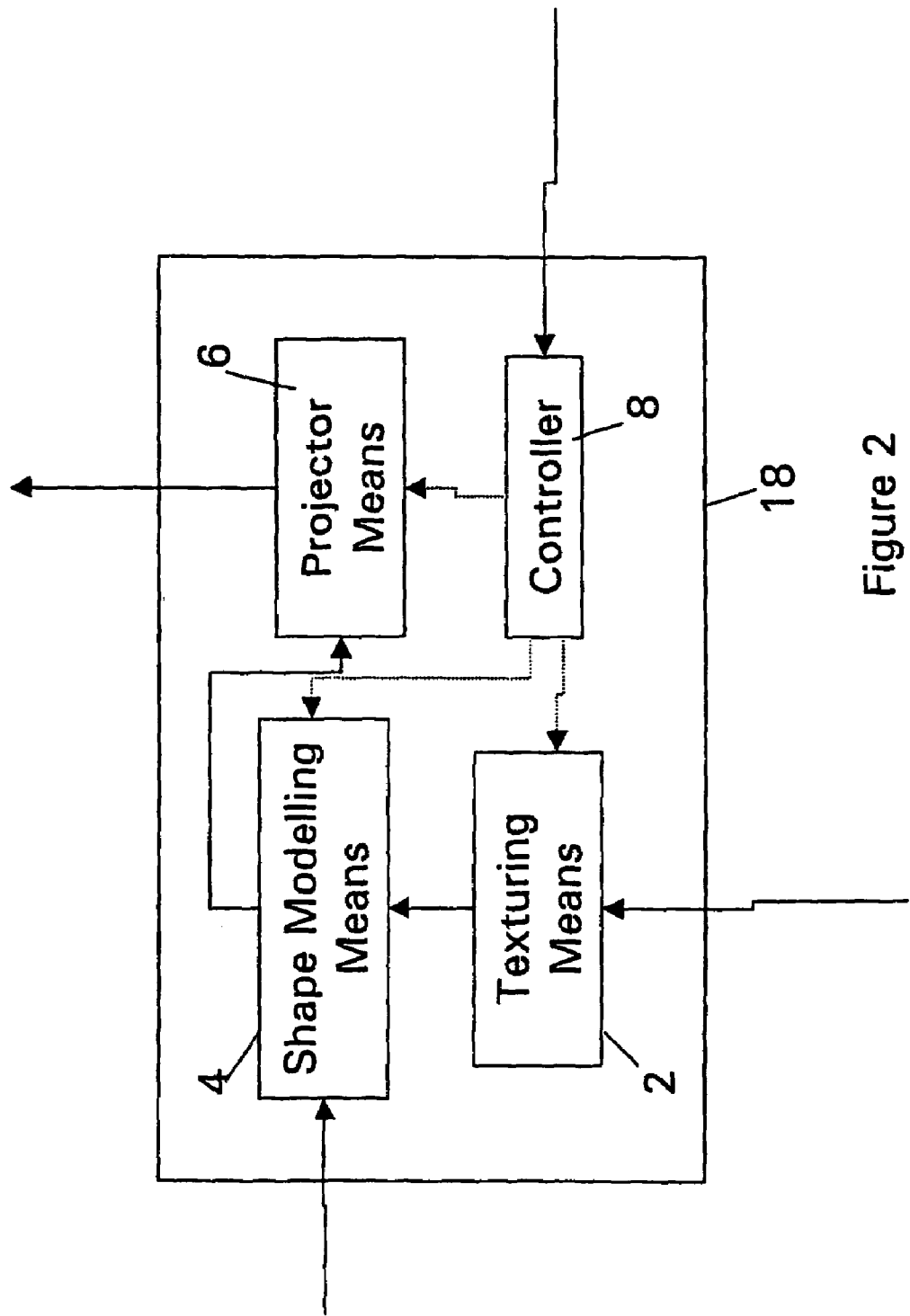
FIG. 2 is a block system diagram of the image processor of FIG. 1.

FIG. 2 illustrates the system functions performed by the image processor 18. More particularly, within the image processor 18 is provided a controller 8, which receives control signals from the control means 16. Control lines shown as dotted lines in FIG. 2 are provided from the controller 8 to each of a texturing means 2, a shape modelling means 4, and a projector means 6. The texturing means 2 receives at its input signals representing images output from the viseme store 208. The shape modelling means 4 receives at its input the data representing the three dimensional shapes from the shape store 206. The shape modelling means 4 is capable of interpreting the received representative data to virtually model the shape represented by the data, such as a cylinder, sphere, ellipsoid, ovoid, or the like.

Further provided within the image processor 18 is a projector means 6 which receives information from the shape modelling means, and acts to perform a virtual projection of the textured surface of the shape to an image position to obtain a second processed image. The projector means 6 therefore outputs the processed image from the processor 18.

Having described the conceptual internal structure of the mobile telephone 100 in accordance with the present invention, the operation of the various elements will now be described with respect to FIGS. 3 and 4. More particularly, FIG. 3 represents a flow diagram of the operation of the overall system, whereas FIG. 4 is a flow diagram of the steps specifically performed by the image processor 18 in accordance with the present invention.

Figure 3:
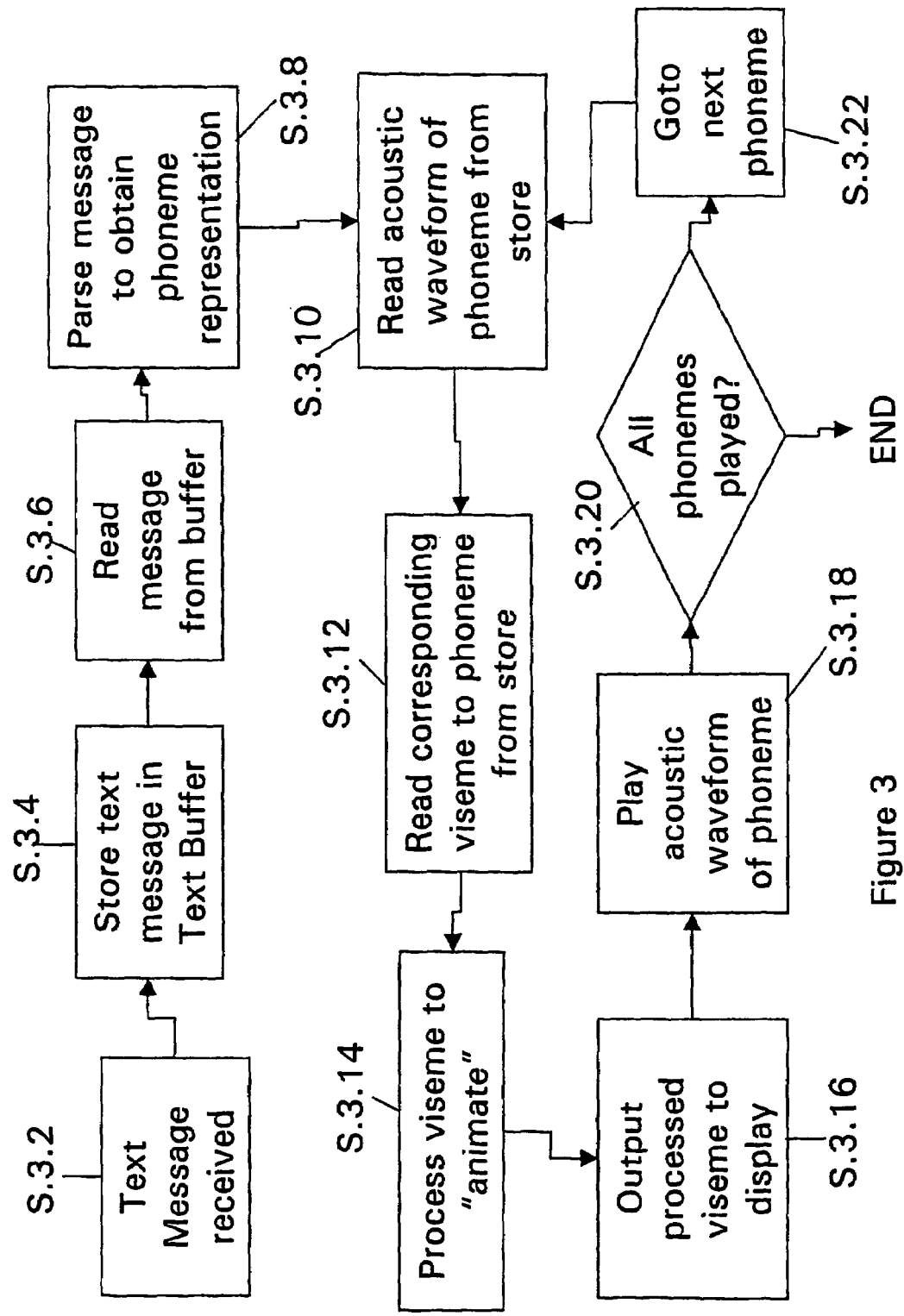
FIG. 3 is a flow diagram illustrating the steps performed by the system of FIG. 1.
Figure 4:
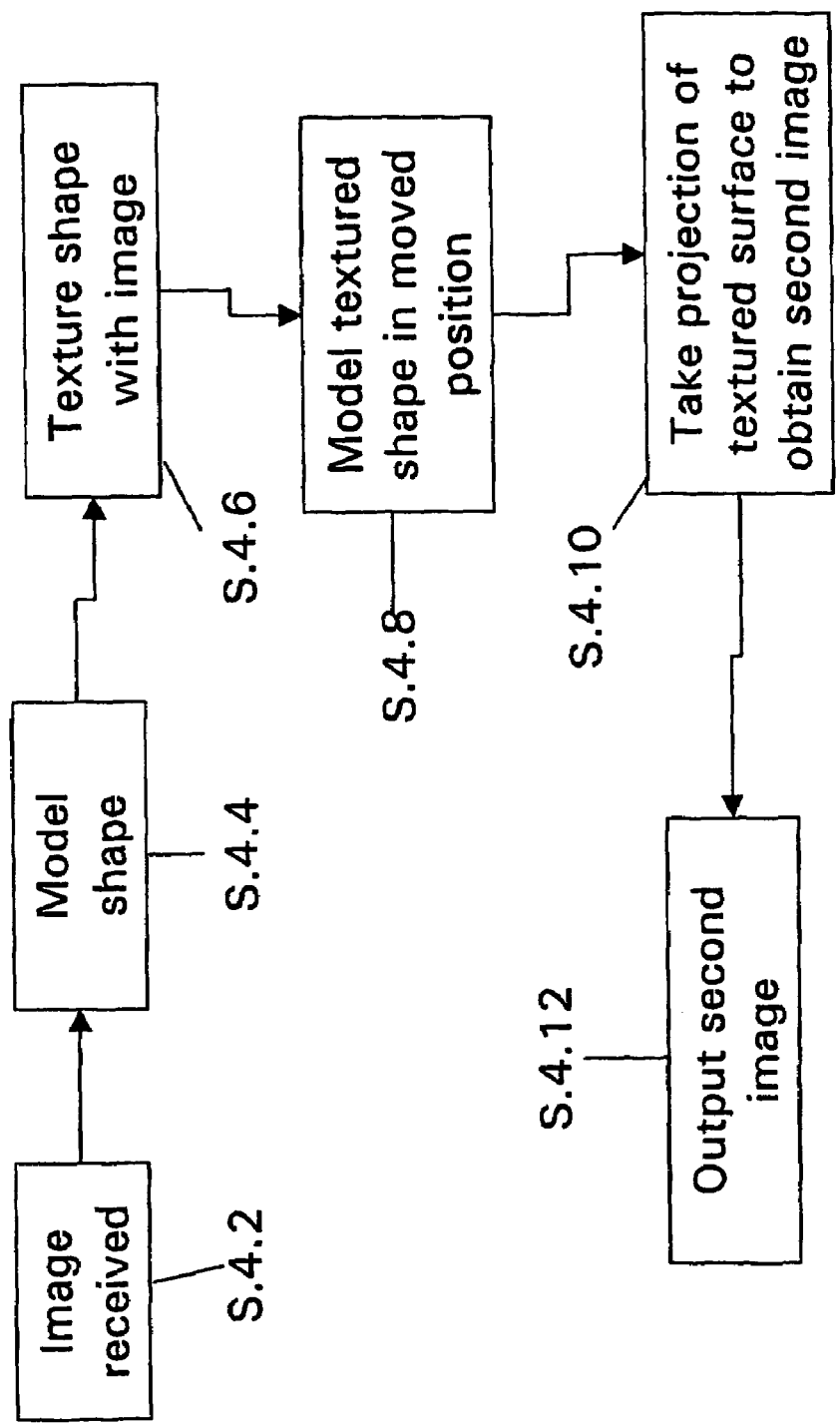
FIG. 4 is a flow diagram showing the steps performed by the image processor of FIG. 2.

With reference to FIGS. 3 and 4, at step 3.2 a text message is received by the text message receiver means 10. Following this, at step 3.4 the text message is stored in the text buffer 12, and then at step 3.6 the parser 14 acts to read the text message as required from the text buffer 12. The parser 14 parses the text of the message to obtain the phoneme representation thereof at step 3.8. As discussed previously, parsing of text to obtain a phoneme representation is known in the art.

The phoneme representation obtained by the parser is passed to the control means 16, which at step 3.10 controls the phoneme store to read the acoustic waveform of the first phoneme in the sequence received from the parser therefrom. At substantially the same time, at step 3.12 the control means controls the viseme store to output from the viseme store 208 the corresponding viseme to the phoneme being presently output from the phoneme store 210. The phoneme output from the phoneme store 210 is passed to the audio reproducing means 108, whereas the viseme output from the viseme store 208 is passed to the image processor 18.

At step 3.14 the image processor 18 processes the received viseme in accordance with the present invention in order to "animate" the image by applying the image processing method of the present invention thereto. This produces the effect on the viseme as if the head represented in the viseme has moved slightly.

Following the processing of the input viseme at the image processor 18, at step 3.16 the processed viseme is output to the display means 102 where it is then displayed to the user. At substantially the same time, at step 3.18 the audio reproducing means 108 plays the acoustic waveform of the present phoneme as received from the phoneme store 210.

Once the present processed viseme has been displayed and the present phoneme played, an evaluation is undertaken at step 3.20 to determine whether all the phonemes in the sequence determined by the parser 14 have been played. If the evaluation determines that all the phonemes have been played then the procedure ends. In contrast, if it is determined that there remain phonemes to be played, and associated visemes to be displayed, then at step 3.22 the controls means 16 moves onto the next phoneme in the sequence and processing returns to step 3.10. The processing steps of step 3.10, step 3.12, step 3.14, step 3.16, step 3.18, step 3.20, and step 3.22 are then repeated in a loop until all of the phonemes output from the parser 14 to the control means 16 have been played, and the associated visemes processed and displayed to the user.

Having described the overall operation of the system, the specific steps performed by the image processor 18 when performing step 3.14 will now be described with respect to FIG. 4.

At step 4.2, the image processor 18 receives a viseme output from the viseme store 208 under the control of the control means 16. Following this, at step 4.4 the image processor 18 accesses the shape store 206 and retrieves the data representative of the 3D shape to which the received image is to be applied. The shape modelling means 4 provided in the image processor 18 receives the data from the shape store, and uses the data to model the shape as a three dimensional geometric shape in virtual space. Next, the texturing means acts at step 4.6 to texture the surface of the shape with a projection of the received image. By texturing we mean that the luminance and chrominance values of the image pixels as projected onto the surface of the shape are effectively bound to the surface, such that the surface is effectively "painted" with the image projection, as previously described.

Following the shape texturing, at step 4.8 the shape modelling means 4 acts to perform a movement of the shape and models the textured shape in the moved position relative to the image position. As described previously in respect of the first embodiment, the movement may be a rotation about any axis of the shape, and in the preferred embodiment the shape is a cylinder and the movement is a rotation about the main access thereof by no more than ten degrees, and preferably by no more than one degree in either direction. The precise movement applied to the textured shape is preferably randomly chosen for each iteration of the process, with the result that each processed image has had a different shape movement applied thereto.

In alternative embodiments, as discussed previously, the movement of the shape may be controlled in response to the speech energy in the phoneme which is to be reproduced with the processed viseme.

Furthermore, in other alternative embodiments it is the image position which is moved relative to the shape, or a combination of both shape and image position relative movement, as discussed previously. As in the previously described embodiment, it is the relative movement between the shape and image position of the processed image which is important, not the absolute movements of each.

Following step 4.8, that is after the textured shape has been modelled in the moved position, at step 4.10 the projector means 6 obtains information of the moved textured shape from the shape modelling means 4 and acts to take a projection of the textured surface of the shape to the position in virtual space of the original received image. The image (comprising the projected pixel luminance and chrominance values) obtained by such a projection located at the position of the original received image is then output by the projector means as the output from the image processor 18 to the display means 102, at step 4.12. The display means 102 then displays the processed image to the user, as described previously.

In accordance with the foregoing, it should therefore be understood that the present invention provides an image processing method and system which allows for images to be processed to produce a particular "aspect ratio change" effect by virtue of the image being applied to a three dimensional shape, a relative movement then being effected between the shape and an image position, and a projection of the applied image then being taken to the image position to obtain a second image. Where the images are visemes, then the relative movement of the shape with respect to the image position to achieve the aspect ratio change effect within the resultant image simulates the small head movements observed of real humans when talking. Therefore, the wooden, lifeless nature of previous viseme images is alleviated, and the overall effect is of a more lifelike image.

It should be noted, that whilst the preferred embodiment of the invention uses the image of a human head, the invention is not limited to processing images of human heads, and images of animal heads, fantasy heads or the like may be used. In particular, by "fantasy heads" we mean images of the heads of fantasy creatures such as, for example, those of the Teletubbies™ as shown on BBC Television, or those of characters from fantasy films such as Star Wars® or the like. Moreover, it should be further understood that whilst the invention has been specifically developed for processing images of faces (whether, human, animal, fantasy or otherwise), its use is not limited to the processing of facial images, and any image which requires an aspect ratio change as previously described and provided by the invention may be processed thereby.

Within the embodiments previously described we have described the invention on a conceptual basis by virtue of the fact that the image is projected onto a shape, the shape then rotated, and then the projection taken from the shape back to the original image position. Whilst in a preferred implementation of the invention the concept as already described may be maintained, and especially using specialist three-dimensional virtual reality programming languages as are known in the art, it should also be understood that the same image processing effects can be obtained via a purely mathematical algorithm. That is, the image to be textured onto the shape can be considered to be simply an array of points located at discrete co-ordinates in a known co-ordinate system, and the shape instead of being represented by polygons as in the preferred embodiment, may instead merely be represented by an appropriate equation in the known coordinate system. The resultant processed image can then be mathematically obtained using the equation for the geometric shape, and applying the appropriate transform to the image coordinates using the shape equation. Such an implementation is clearly intended to be covered by the appended claims, in that it really does no more than embody the concept of the present invention as already described in respect of the preferred embodiments. For completeness, therefore, there follows a mathematical analysis of the image processing method according to the present invention, which represents in mathematical terms the basic, projection, relative movement, and second projection steps already described. The mathematical analysis of the present invention will be described, with reference to FIGS. 8 to 13.

Figure 8:
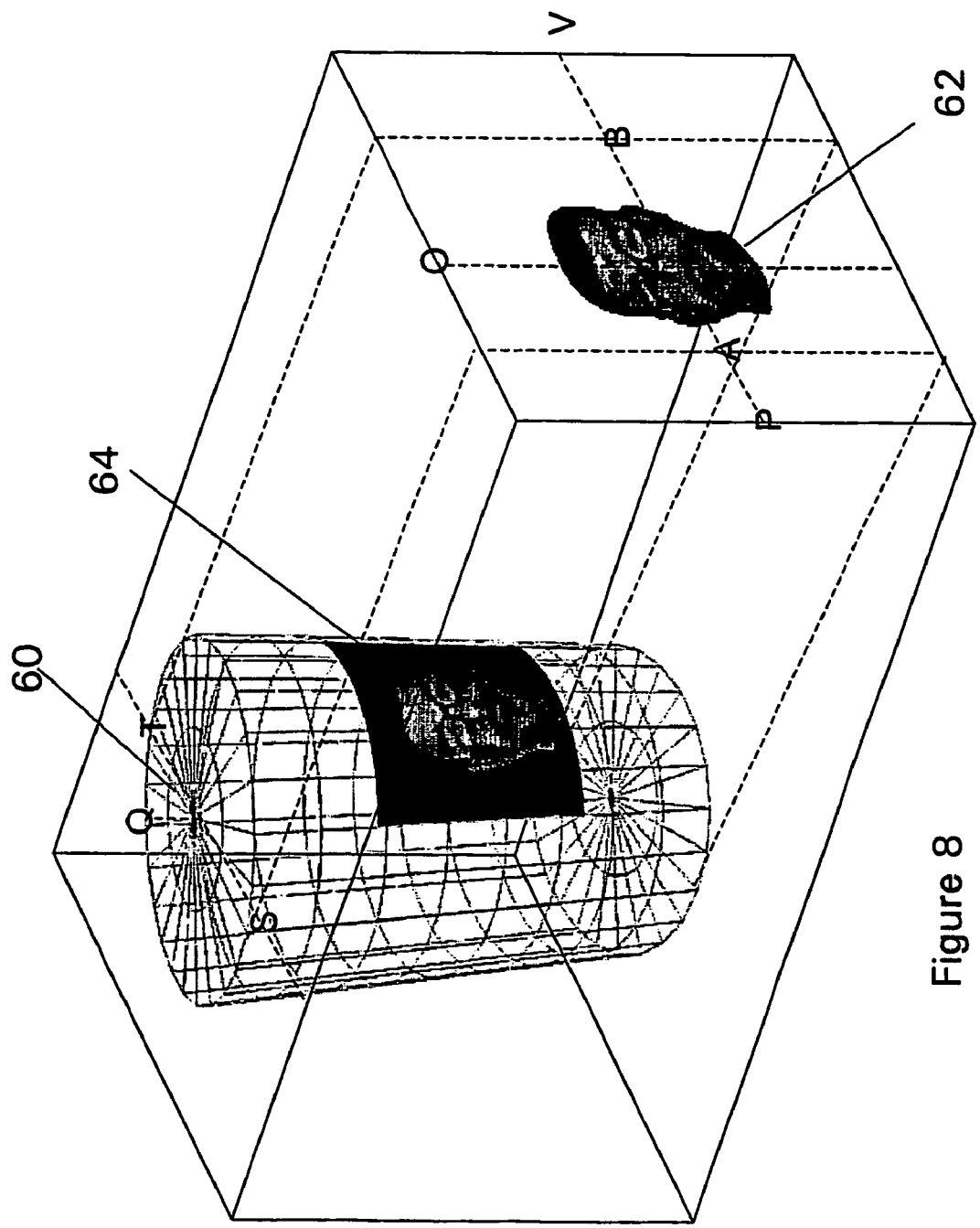
FIG. 8 is a perspective view providing for a mathematical analysis of the operation of the present invention.

FIG. 8 shows a perspective view of the three-dimensional virtual space in which the image and shape objects of the present invention exist. In particular, FIG. 8 illustrates the respective positioning and orientation of the image to be processed and the virtual shape model within the virtual space.

Figure 9:
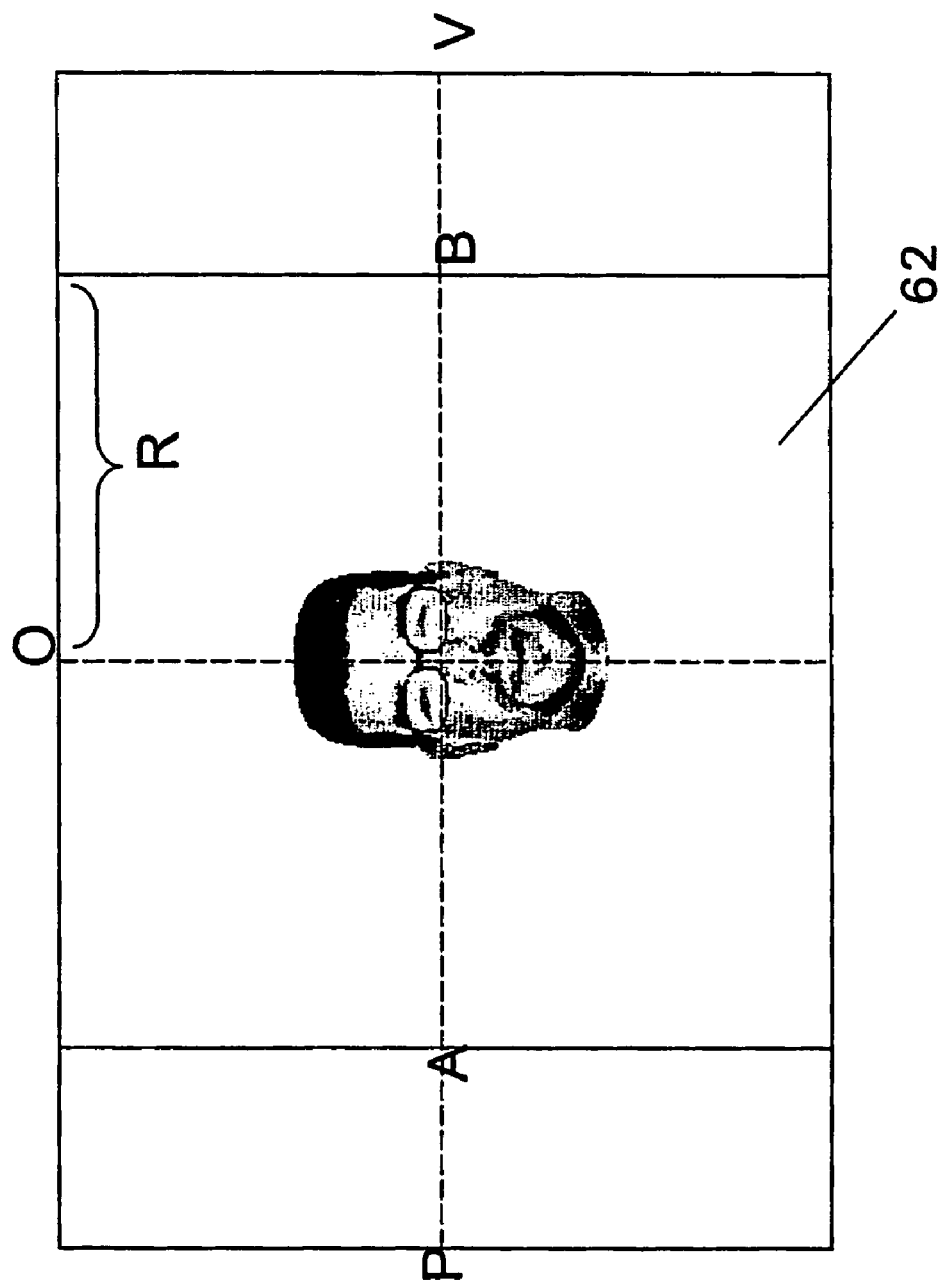
FIG. 9 is an elevational view of the first image of the present invention.
Figure 10:
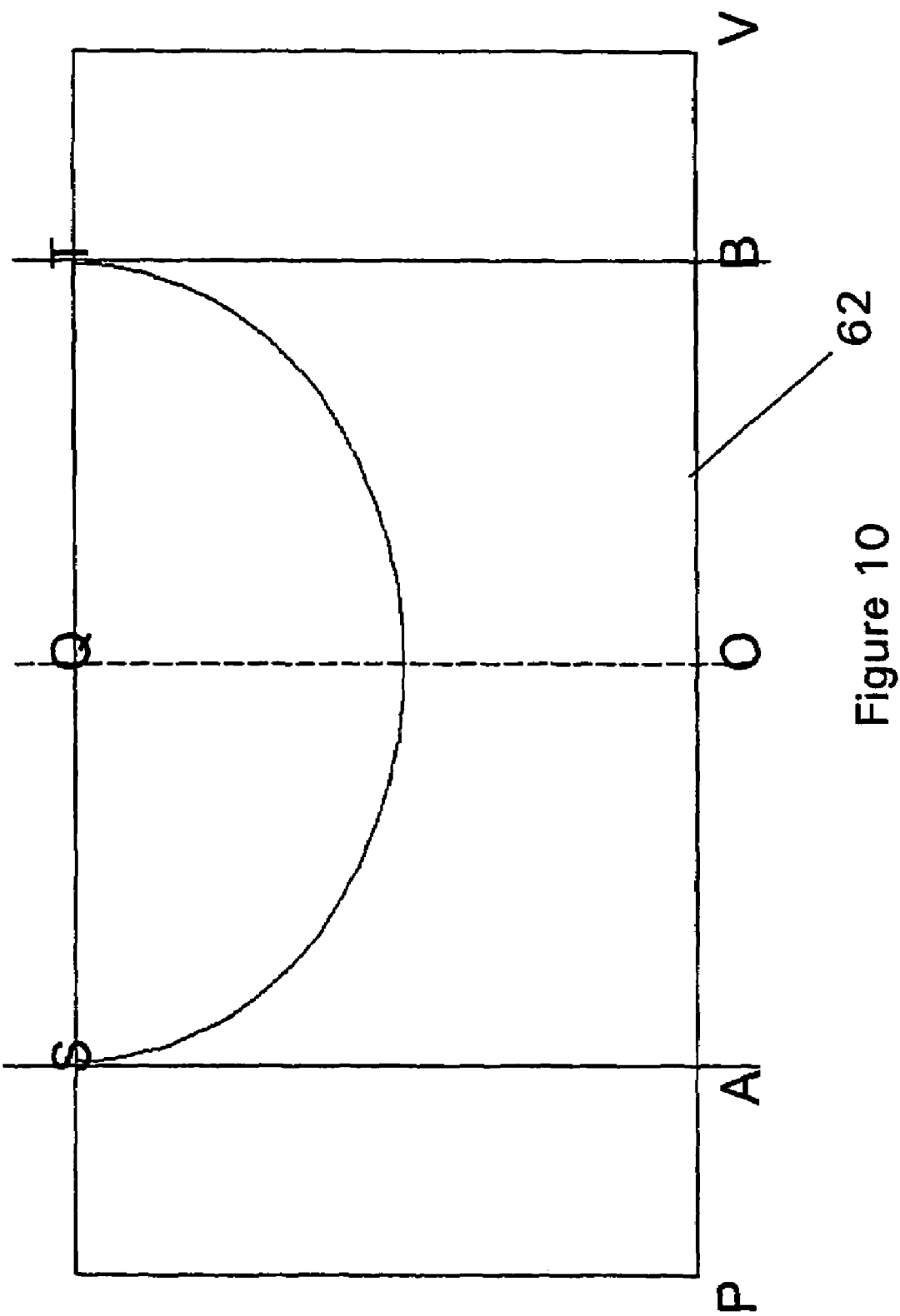
FIG. 10 is a diagram representing the arrangement of FIG. 8 in plan view.
Figure 11:
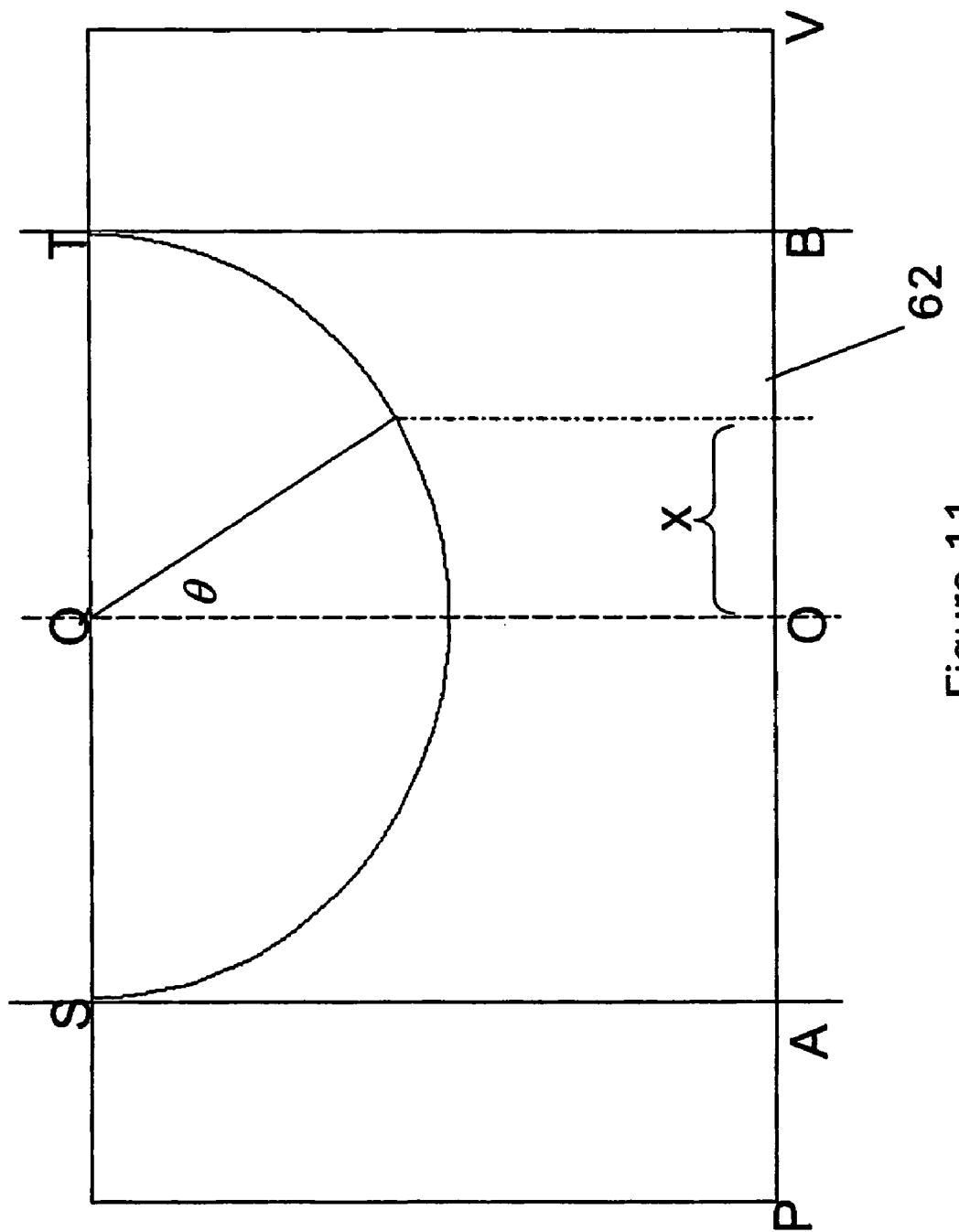
FIG. 11 is a diagram showing the arrangement of FIG. 8 in plan view, but illustrating a movement of the cylinder.
Figure 12:
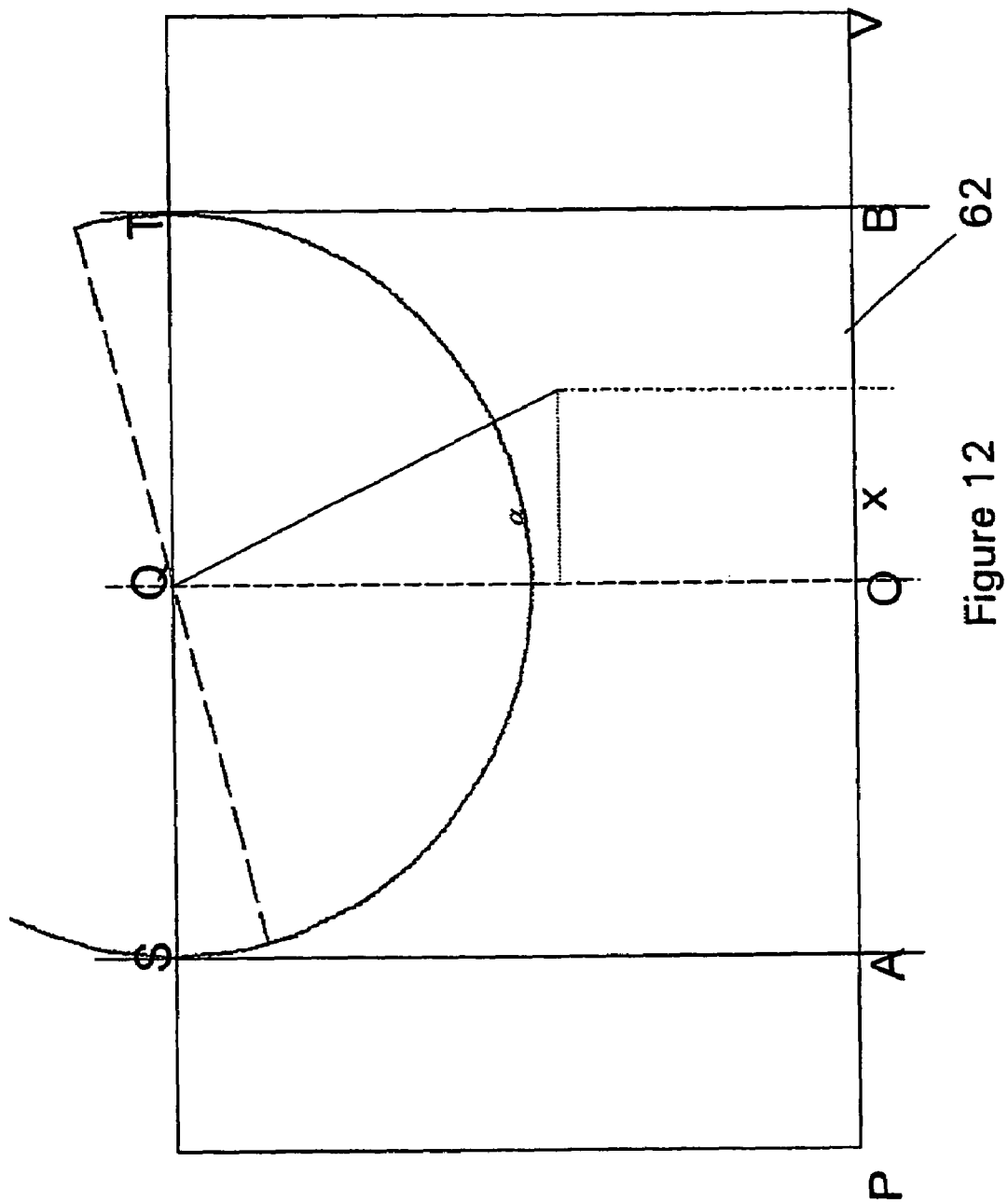
FIG. 12 is a plan view of FIG. 8 also illustrating a movement of the cylinder.
Figure 13:
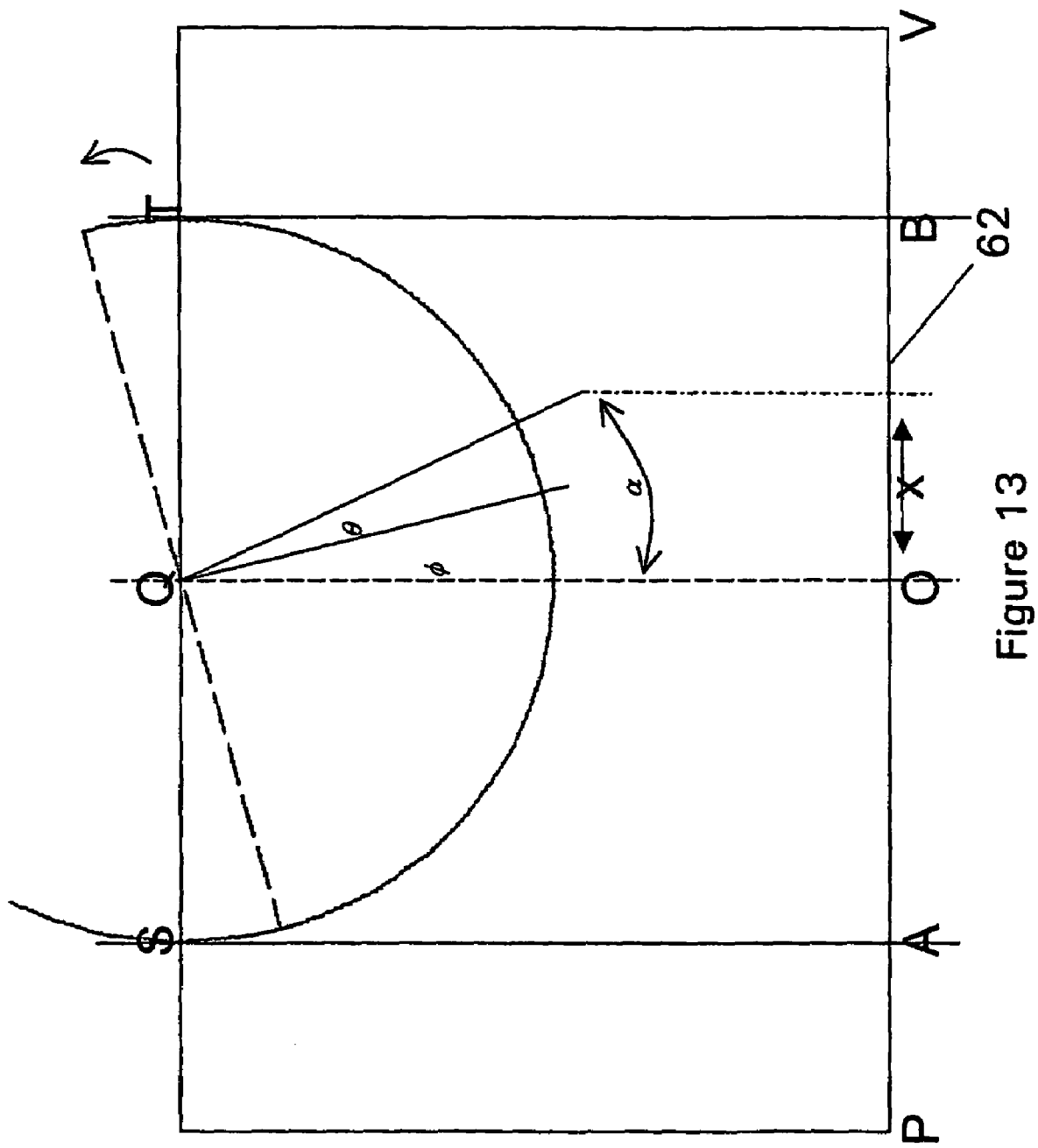
FIG. 13 is also a plan view of the arrangement of FIG. 8 and also showing a movement of the cylinder through certain angles.

FIG. 9 illustrates the image to be processed from a viewpoint directly in front, i.e. orthogonal to the plane of the image. Conversely, FIG. 10 shows a view taken from above in the direction of the axis of the cylinder. In this case the view is along the image plane, such that image is no longer evident from this view-point (due to it being two-dimensional). FIGS. 11, 12, and 13 illustrate a similar view.

Where the shape is a cylinder it is only necessary to do the calculations for a circle at any point on the surface of the cylinder, for example at the level of AB. The resultant formula will then be the same the whole way up or down the vertical dimension of the cylinder, as the cross-section in this direction does not vary.

Firstly, calculate the luminance of the head textured onto the cylinder, that is $L_C$. The only requirement is that when the cylinder is facing exactly forward it must project on to the screen to appear identical to the luminance of the original still picture—Ls, say.

With reference to FIG. 11, let $\partial$ be the angle subtended by the point of interest in the image. $\partial$ is 'fixed' to the cylinder.

Since $x = r \sin \theta$ $L_C(\partial) = L_S(x) = L_S(r \sin \partial)$ $\Rightarrow L_C(\partial) = L_S(x) = L_S(r \sin \partial)$      Eq 1

Next, with reference to FIG. 12, Calculate the luminance displayed on the screen ($L_D$) when the cylinder is rotated at an angle $\alpha$ Here, let $L_{CR}$ be the luminance of the rotated cylinder (at $\alpha$), then $L_D(x) = L_{CR}(r \sin \alpha)$ (See FIG. 12); but $L_{CR}(\alpha) = L_{CR}(\partial + \phi)$ (See FIG. 13)

where $\alpha = \partial + \phi$, since it is an angle of rotation $\phi$ plus angle of displacement $\partial$ i.e.

$L_{CR}(\partial + \phi) = L_C(\partial)$

Angle of displacement is $\partial$

Angle of rotation is $\phi$

Now, from Eq 1: $L_C(\partial) = L_S(r \sin \partial)$

But: $r \sin \alpha = x$

Therefore: $\partial + \phi = \arcsin(x/r)$ $$\Rightarrow \vartheta = \arcsin(x/r) - \phi$$

$$\Rightarrow L_C(\vartheta) = L_S\{r\sin(\arcsin(x/r) - \phi)\}$$

$$\Rightarrow L_C(\vartheta) = L_S\{x\cos\phi - \sqrt{r^2 - x^2}\sin\phi\}$$

$$\Rightarrow \quad = \boxed{L_D = L_S\{x\cos\phi - \sqrt{r^2 - x^2}\sin\phi\}}$$

Thus, it will be seen from the foregoing that the present invention can be embodied in either the conceptual basis as described in respect of the preferred embodiment, or on a purely mathematical basis as shown above, and that the two are not mutually exclusive. The same effect of obtaining a processed image which has undergone an "aspect ratio change" is obtained in either case.

Furthermore, the invention should not be taken to being limited to implementation through electronic or other processing means, as it is quite possible to implement the invention and achieve the same effects through an actual physical implementation of the invention. Therefore, in further embodiments there is provided an image projector arranged to display an image via projection onto a surface of a shape. The image projector may be a slide projector, or a digital light projector, or the like. A three-dimensional shape made, for example, of plastic or polystyrene and preferably light-coloured is further provided, positioned relative to the image projector to receive the projection of the image on a surface thereof. A camera, which may be digital, video, or film-based or the like, is further provided focused on the projection of the image on the shape surface, and arranged to capture images thereof. The camera is preferably provided adjacent to but not exactly co-located with the projector, such that the camera optical axis is at a slight angle (of preferably no more than ten degrees, and preferably no more than 1 degree) to the optical axis of the projector. Such a location of the camera simulates the movement of the image position relative to the shape, without there having to be any actual movement of any of the projector, shape, or camera.

The operation of such an arrangement is straightforward, and similar to the previously described embodiments. That is, the projector acts to project an image, being preferably a viseme or the like, onto the surface of the shape, thereby effectively "texturing" the surface. The camera, being focused on the surface of the shape, captures an image of the projected image, which by virtue of the optical axis of the camera being at an angle to the optical axis of the projector exhibits the "aspect ratio change" effect provided by the invention. The image captured by the camera is then output as the processed image.

For a succession of images to be processed the position of the camera and/or the projector relative to each other are altered, such that an apparently random aspect ratio change is observed for each successive image.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

The invention claimed is:

1. An image processing method comprising:
   a) texturing at least one surface of a three-dimensional geometric shape by projecting a two-dimensional first image from a two-dimensional first image position and orientation thereof onto said at least one surface of said three-dimensional geometric shape;
   b) relatively moving the three-dimensional shape with respect to the image position to which projection of the textured surface is to be made;
   c) projecting the textured surface of the three-dimensional geometric shape to the two-dimensional image position to obtain a two-dimensional second image at the two-dimensional first image position and in the same orientation as said first two-dimensional image,
   wherein the relative movement of the three-dimensional geometric shape to the two-dimensional first image position generates an aspect ratio change in said second image with respect to said first image; and
   d) displaying said second image.

2. A method as in claim 1, wherein said first image forms part of a sequence of first images, the method further comprising:
   repeating steps a), b), and c) for each first image in said sequence to obtain a corresponding sequence of second images.

3. A method as in claim 2, wherein the respective sequences of first and second images each form an animated sequence of a face speaking.

4. A method as in claim 2, and further comprising:
   displaying said second sequence of second images to a user, and
   reproducing recorded or synthesized sound, which may be speech, in synchrony with said display.

5. A method as in claim 4, wherein the moving step further comprises:
   moving the relative position of the three-dimensional shape to the two-dimensional first image position in dependence on the energy in the reproduced sound.

6. A method as in claim 1, wherein the moving step further comprises randomly moving relative positions of the three-dimensional geometric shape to the two-dimensional first image position.

7. A method as in claim 1, wherein the moving step further comprises rotating said three-dimensional geometric shape about one or more axes thereof.

8. A method as in claim 7, wherein said rotation is no more than 10 degrees in a clockwise or counter-clockwise direction about one or more of said axes.

9. A method as in claim 1, wherein the shape is one of a group consisting of: a sphere, a cylinder, an ellipsoid, an ovoid, or a double-cylinder.

10. A method as in claim 1, wherein said first image is an image comprising a plurality of pixels located at the two-dimensional first position in a virtual space, and said three-dimensional geometric shape is a data representation of a three-dimensional virtual model of a three-dimensional geometric shape located in said virtual space, modeled by a processor.

11. A tangible storage medium containing a computer program which, when executed by a computer system, causes the computer system to perform the method of claim 1.

12. An image processing system comprising:
   image receiving means for receiving a first image to be processed;
   image processing means; and
   image output means for outputting a second, processed image;
   the image processing means comprising shape modeling means arranged to model a three-dimensional geometric shape with a projection of a two-dimensional first image from a two-dimensional first image position and orientation thereof onto said at least one surface;

b) relatively move the three-dimensional shape with respect to the image position to which projection of the textured surface is to be made, and c) project the textured surface of the three-dimensional geometric shape to the two-dimensional image position to obtain a two-dimensional second image at the two-dimensional first image position and in the same orientation as said first two-dimensional image, wherein the relative movement of the three-dimensional geometric shape to the two-dimensional first image position generates an aspect ratio change in said second image with respect to said first image.

13. A system as in claim 12, wherein said first two-dimensional image forms part of a sequence of first images, the system being further arranged to:

receive each first image in said sequence at said image receiving means, said image processing means being arranged to repeat steps a), b), and c) for each first image in said sequence to obtain a corresponding sequence of second images.

14. A system as in claim 13, wherein the respective sequences of first and second images each form an animated sequence of a face speaking.

15. A system as in claim 13, and further comprising:

display means for displaying said second sequence of two-dimensional second images to a user, and sound reproduction means for reproducing recorded or synthesized sound, which may be speech, in synchrony with said display.

16. A system according to claim 15, wherein the image processing means is further arranged to move the relative position of the three-dimensional geometric shape to the two-dimensional first image position in dependence on the energy in the reproduced sound.

17. A system as in claim 12, wherein the image processing means is further arranged to move the relative position of the three-dimensional geometric shape to the two-dimensional first image position randomly.

18. A system as in claim 12, wherein the image processing means is further arranged to move the relative position of the three-dimensional geometric shape by rotating said three-dimensional geometric shape about one or more axes thereof.

19. A system according to claim 18, wherein said rotation is no more than 10 degrees in a clockwise or counter-clockwise direction about one or more of said axes.

20. A system as in claim 12, wherein the three-dimensional shape is one of a group consisting of: a sphere, a cylinder, an ellipsoid, an ovoid, or a double-cylinder.

21. A system as in claim 12, wherein said two-dimensional first image is an image comprising a plurality of pixels located at said first position in a virtual space, and said three-dimensional geometric shape is data representative of a three-dimensional virtual model of a geometric shape located in said virtual space, modeled by said shape modeling means.

22. A method as in claim 1 wherein the textured surface is a three-dimensional surface.

23. A method as in claim 1 wherein the geometric shape is kept in the same position and the image position to which the projection of the textured surface is made is moved around the shape.

24. A method as in claim 8 wherein said rotation is no more than 1 degree in a clockwise or counter-clockwise direction about said axes.

25. A system as in claim 19 wherein said rotation is no more than 1 degree in a clockwise or counter-clockwise direction about said axes.

26. A system as in claim 12 wherein the geometric shape is kept in the same position and the image position to which the projection of the textured surface is made is moved around the shape.

27. A system as in claim 12 wherein said textured surface is a three-dimensional surface.

28. Apparatus for implementing a method according to claim 1, the apparatus comprising:

a computer-readable storage medium storing a computer program, wherein in use said apparatus is arranged to enable said computer program to be executed by a computer system which causes the computer system to perform the method of claim 1.

29. An image processing method for creating an image sequence simulating a talking and moving head, said method comprising:

a) texturing a surface of a three-dimensional geometric shape by projecting a two-dimensional first image representing a human head from a first position;

b) moving the three-dimensional shape relative to the image position;

c) projecting the textured surface of the three-dimensional geometric shape to the two-dimensional image position so as to obtain a second two-dimensional image at the same first image position and in the same orientation;

d) repeating steps a–c to create a sequence of images representing said talking and moving head, wherein the relative movement of the tree-dimensional geometric shape to the two-dimensional first image position generates an aspect ratio change in said second image with respect to said first image; and e) displaying said second image.

* * * * *